United States Patent
Tao et al.

(10) Patent No.: US 6,847,728 B2
(45) Date of Patent: Jan. 25, 2005

(54) DYNAMIC DEPTH RECOVERY FROM MULTIPLE SYNCHRONIZED VIDEO STREAMS

(75) Inventors: Hai Tao, Santa Cruz, CA (US); Harpreet Singh Sawhney, West Windsor, NJ (US); Rakesh Kumar, Monmouth Junction, NJ (US)

(73) Assignee: Sarnoff Corporation, Princeton, NJ (US)

( * ) Notice: Subject to any disclaimer, the term of this patent is extended or adjusted under 35 U.S.C. 154(b) by 217 days.

(21) Appl. No.: 10/315,291

(22) Filed: Dec. 9, 2002

(65) Prior Publication Data

US 2004/0109585 A1 Jun. 10, 2004

(51) Int. Cl.[7] .................................................. G06K 9/00
(52) U.S. Cl. ........................................ 382/106; 382/154
(58) Field of Search .............................. 382/106, 154, 382/171, 172, 173, 107; 356/3, 12; 345/419, 427, 426; 348/42, 47

(56) References Cited

U.S. PATENT DOCUMENTS

| | | | | |
|---|---|---|---|---|
| 5,109,425 | A | * | 4/1992 | Lawton ....................... 382/107 |
| 6,046,763 | A | * | 4/2000 | Roy ............................. 348/47 |
| 6,430,304 | B2 | * | 8/2002 | Hanna et al. ................ 382/107 |
| 6,490,364 | B2 | * | 12/2002 | Hanna et al. ................ 382/107 |
| 6,664,962 | B1 | * | 12/2003 | Komsthoeft et al. ........ 345/426 |
| 2002/0061131 | A1 | | 5/2002 | Sawhney et al. |

OTHER PUBLICATIONS

Sawhney et al., Object tracking with bayesian estimation of dynamic layer representations, Jan. 2002, IEEE pp. 75–89.*
Tao et al., Dynamic layer representation with applications to tracking, IEEE 2000.*
Zhang et al., Specetime stereo: Shape recovery for dynamic scenes, IEEE 2003.*
H. Tao et al.; "Global Matching Criterion and Color Segmentation Based Stereo"; Proc. Workshop on the Application of Computer Vision (WACV2000); pp. 246–256, Dec. 2000.

* cited by examiner

*Primary Examiner*—Vikkram Bali
(74) *Attorney, Agent, or Firm*—William J. Burke (57) ABSTRACT

A method of generating a dynamic depth map for a sequence of images from multiple cameras models a scene as a collection of 3D piecewise planar surface patches induced by color based image segmentation. This representation is continuously estimated using an incremental formulation in which the 3D geometric, motion, and global visibility constraints are enforced over space and time. The proposed algorithm optimizes a cost function that incorporates the spatial color consistency constraint and a smooth scene motion model.

6 Claims, 6 Drawing Sheets

DYNAMIC DEPTH RECOVERY FROM MULTIPLE SYNCHRONIZED VIDEO STREAMS

The U.S. Government has a paid-up license in this invention and the right in limited circumstances to require the patent owner to license others on reasonable terms as provided for by the terms of contract no. F30602-00-C-0143 awarded by the U.S. Air Force Research Laboratory.

The present invention concerns image processing algorithms to recover depth information and in particular an incremental algorithm for generating a depth map using color segmentation and optical flow optimized according to a simplified objective function.

BACKGROUND

The problem of recovering depth information using images captured simultaneously from multiple viewpoints has been studied extensively. In recent years, with advances in computing and imaging technologies, capturing multiple synchronized high quality video streams has become easier and the problem of recovering depth maps of dynamic scenes using synchronized capture has received increasing attention. In the materials that follow, this problem is referred to as dynamic depth recovery. Dynamic depth recovery may be considered as an extension of the traditional stereo computation problem where the depth solution desirably makes images consistent not only across multiple views, but also across different time instants.

A straightforward approach for dynamic depth recovery is to apply a standard stereo estimation algorithm at each time instant. A comprehensive survey on early stereo algorithms can be found in an article by U. R. Dhond et al., entitled "Structure From Stereo: a Review," *IEEE Transactions on System, Man and Cybernetics*, vol. 19, no. 6, pp. 1489–1510, 1989. One new approach for finding depth information from two image sequences is described in an article by H. Tao et al. entitled "Global Matching Criterion and Color Segmentation Based Stereo," *Proc. Workshop on the Application of Computer Vision* (WACV2000), pp. 246–253 December 2000. The principle underlying these algorithms is to find a depth solution that optimizes an image match measure across views. This measure is referred to as the spatial match measure. This straightforward solution, however, ignores two constraints present in multi-view image sequences.

The first constraint encodes the geometric relationship between the 3D motion of a scene point and its 2D projections in multiple synchronized images. This relationship is referred to as the scene flow constraint. By applying this constraint, temporal 2D image correspondences can be used to infer 3D scene motion and, therefore, constrain the depth information over time. For stereo images processed using optical flow techniques, accurate optical flow calculations are important in order to successfully the apply scene flow constraint directly to depth estimation. These calculations are important because the effects of unreliable flow at object boundaries and in untextured regions propagate into the final depth map.

The second constraint arises from the observation that objects in the scene usually deform or move smoothly. Applying this constraint helps to obtain temporally consistent depth solutions and to eliminate ambiguities that may not be easy to resolve at any single time instant. This constraint has been applied using rigid parametric motion models, such as that described in an article by K. Hanna et al. entitled "Combining Stereo and Motion Analysis for Direct Estimation of Scene Structure" *Proc. Int. Conf. on Computer Vision*, pp. 357–365, 1993. The constraint has also bee applied using non-rigid parametric motion models, such as that disclosed by Y. Zhang et al. in a paper entitled "Integrated 3D Scene Flow and Structure Recovery from Multiview Image Sequences," Proc. *IEEE Conf. on Computer Vision and Pattern Recognition* (CVPR '00), pp. II-674–681, 2000.

SUMMARY OF THE INVENTION

The present invention is embodied in a method for generating a dynamic depth map of a scene from a sequence of sets of segmented images of the scene, wherein each set includes images taken from different viewpoints. The method determines a temporal correspondence between segments in one image in a current set and corresponding segments in an image in a prior set of images obtain a temporal depth predicted value for each segment in the current set of segmented images. The method then determines a spatial correspondence among segments in the current set of segmented images to obtain a spatial depth predicted value for each segment in the one image of the current set of images. The method then selects the temporal depth predicted value or the spatial depth predicted value as an initial depth estimate for each of the segments and warps the current image into the coordinate system of each other image in the current set of images to produce a set of warped images. The method then generates a measure of difference between the warped images and each of the other images in the current set of images. The steps of selecting the depth value, warping the images and generating the measure of difference are repeated until a minimum measure of difference is found.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION

Overview

The present invention is directed to a dynamic depth recovery method in which a scene representation that consists of piecewise planar surface patches is estimated within an incremental formulation. In the exemplary algorithm, this representation is derived, in part, based on color segmentation of input images and, in part, based on optical flow. The proposed formulation integrates constraints on geometry, motion, and visibility over both space and time. More specifically, the scene surface corresponding to each homogeneous color region and each textured region in the image is modeled as a 3D plane. The motion of this plane is described using a constant velocity model. The spatial match measure and the scene flow constraint for this representation is analyzed. The exemplary dynamic depth recovery algorithm is developed based on the observation that the spatial match measure depends only on the out-of-plane motion of each planar surface. The exemplary method enforces the motion model without explicitly using the scene flow constraint and therefore avoids the propagation of the errors in optical flow computation to depth estimation. The global matching framework proposed in the above referenced article by Tao et al. is adopted for enforcing the visibility constraint and also for initializing and refining the depth solution. As a result, the visibility constraint is enforced both across different views and over different time instants.

Figure 1A:
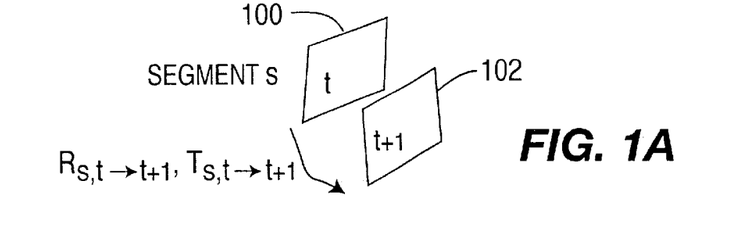
FIGS. 1A and 1B are image diagrams which are useful for describing the operation of the invention.
Figure 1B:
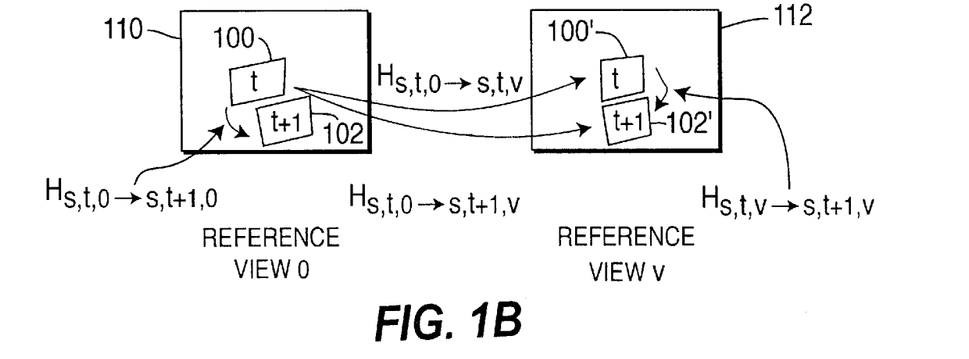

FIGS. 1A and 1B illustrate the configuration of a multi-camera video capture system. For the sake of simplicity and without loss of generality, a formulation for the motion of a single planar structure is first described. The formulation may then be directly applied to handle a piecewise planar scene description. In all of the embodiments described herein, it is assumed that both the intrinsic and extrinsic parameters of the cameras which recover the multiple images are known. The camera extrinsic parameters, namely the relative positions and orientations of the cameras, are represented with respect to the camera coordinate system of a reference view. The planar scene surfaces are also represented in this coordinate system. The calibration matrices of the M+1 cameras are $K_v$, v=0, ..., M. The rotation and translation pair $(R_0, T_0)=(I,0)$ represents the camera pose for the reference camera 0 and the pair $(R_v, T_v)$ represents the pose of the inspection cameras $v \in \{1, \ldots, M\}$. Although the invention is described below in terms of a single reference camera and a single inspection camera, it is contemplated that it may be practiced using multiple inspection cameras. This is illustrated in FIG. 1A which shows a segment s at time t, 100, and at time t+1, 102. The motion of the segment s between time t and t+1 is represented by the rotation and translation pair $R_{s,t \to t+1}$, $T_{s,t \to t+1}$.

For time instant t, only the depth map in the reference view is estimated. In this representation, each of the s homogeneous color segments in the reference view corresponds to a planar surface in the world. Therefore, the depth map can be derived from the plane parameters $\psi_{s,t,0}=[n_{s,t,0}, d_{s,t,0}]$, $s \in [1, \ldots, S]$, where $n_{s,t,0}$ is the normal vector of the plane surface in segment s at time instant t and $d_{s,t,0}$ is the distance of that plane to the center of the reference camera.

At any given instant, relating multiple views of a scene plane leads to the spatial matching constraint. Matched image points on the same scene plane across these views over-constrain the plane's geometry. On the other hand, relating multiple views of a scene plane over time leads to the planar scene flow constraint. Matched image points on the same scene plane over time over-constrain the plane's 3D motion and, in turn, its geometry. The exemplary dynamic depth recovery algorithm provides a piecewise planar depth map that optimizes a spatial match measure and a temporal match measure subject to a motion smoothness prior constraint.

Spatial Match Measure

Adopting the global matching framework described in the above-referenced article by Tao et al., the exemplary method calculates a match measure that is a function of the difference between the real inspection views and the inspection views predicted based on the reference image and its depth map. Prediction is done by depth based forward warping in which the global visibility is handled using z-buffering. The warping function for each segment is a homography determined by its plane parameters. Briefly, in the exemplary embodiment of the invention, the global match measure is the sum over all image segments and over all inspection images of the sum-of-squared differences between the actual inspection image and the predicted inspection image obtained by forward-warping the reference image using the homography. As shown in FIG. 1B, More specifically, at time instant t for the reference view $I_{t,0}$, and the inspection view $I_{t,v}$, v=1, ..., M, the global match measure is given by equation (1)

$$E_t^1(\psi_{1,t,0}, \ldots, \psi_{S,t,0}) = \sum_{s=1}^{S} \sum_{v=1}^{M} E(I_{s,t,0}, I_{t,v}) \quad (1)$$

where $E(I_{s,t,0}, I_{t,v}) = g(I_{t,v}, \text{forward\_warp}(I_{s,t,0}, H_{s,t,0 \to s,t,v}))$ and g( ) is the sum of squared differences function. It is noted that only pixels visible in the inspection views are considered. For segment s, the forward warping function warps the image 100 of the segment $I_{s,t,0}$ to inspection view v 100' through a homography $H_{s,t,0 \to s,t,v}$ induced by the plane model. This homography can be computed as shown in equation (2):

$$H_{s,t,0 \to s,t,v} = K_v \left[ R_{0 \to v} + \frac{T_{0 \to v} n_{s,t,0}^T}{d_{s,t,0}} \right] K_0^{-1} \quad (2)$$

where $R_{0 \to v}$ and $T_{0 \to v}$ are the relative rotation and translation between the reference view 0 and the inspection view v. This homography is determined only by the vector which is normal to the plane of segment s and the distance of the plane from the camera center. Therefore, the homography is affected only by out-of-plane motions as an in-plane motion leaves the plane normal and the distance unchanged.

Scene Flow Constraint

FIG. 1B shows two images, a reference image 110 and an inspection image 112. In each of these images, a plane segment s translates and rotates. In image 110, the initial position of the segment is shown as segment 100 and its translated and rotated position is shown as segment 102. In the reference image 112, the initial position is represented by segment 100' and the translated and rotated position by segment 102'. The scene flow constraint relates the 3D motion of a plane and the resulting 2D optical flow fields or image correspondences. With reference to FIG. 1B, if the plane 100 of segment s undergoes a motion described by the rotation/translation pair $(R_{s,t \to t+1}, T_{s,t \to t+1})$ to produce the plane 102. The image projections of the plane 100 in the reference view between times t and t+1 are related by the homography of equation (3):

$$H_{s,t,0 \to s,t+1,0} = K_0 \left[ R_{s,t \to t+1} + \frac{T_{s,t \to t+1} n_{s,t,0}^T}{d_{s,t,0}} \right] K_0^{-1} \quad (3)$$

Also, the homography between the plane 100 in the reference view at time t and the translated and rotated plane 102' in the inspection view v at time t+1 is given by equation (4):

$$H_{s,t,0 \to s,t+1,v} = H_{s,t,v \to s,t+1,v} H_{s,t,0 \to s,t,v} \quad (4)$$

where the first term is the homography in view v for segment s between the two time instants, which can be computed using equation (3) in the camera coordinate system of view v. The second term is the spatial homography defined in the previous section. Thus, equation (4) may be used to forward-warp the plane 100 in the reference image 110 to attempt to match the plane 102' in the inspection image 112.

The temporal match measure $E_{t,s}^2$ of the segment s induced by the 3D motion of the plane is given by equation (5).

$$E_{t,s}^2(R_{s,t \to t+1}, T_{s,t \to t+1}) = \sum_{v=0}^{M} g(\text{forward\_warp}(I_{s,t,0}, H_{s,t,0 \to s,t+1,v}), I_{t+1,v}). \quad (5)$$

This error function computes the match measure between views 0 before the motion and view v after the motion. Note that the temporal homography constraint for just one view is sufficient to solve for the planar motion parameters. Therefore the error function over-constrains motion parameters of the plane. It is also clear that the temporal match measure is affected both by in-plane and out-of-plane motions.

Motion Smoothness Constraint

Various motion models such as a constant velocity model or a constant acceleration model can be employed to constrain the depth estimation process. The exemplary embodiment of the present invention uses a constant rotational/translational velocity model in the local coordinate system of each segment. This coordinate system is obtained by translating the origin of the reference camera coordinate system to the point on the plane that corresponds to the centroid of the image segment. Using an instantaneous motion formulation, described below, it is shown that this model also induces constant velocities in the normal vector n and the plane distance $\tilde{d}$. In other words, the constant velocity model for the motion of the plane results in a constant velocity model for its out-of-plane motion parameters. Deviations from this model are penalized through a motion smoothness cost function, which is integrated in the depth estimation process.

That the instantaneous motion formulation used in the exemplary embodiment of the invention results in motion that is constant both for the plane and for its parameters n and d may be shown as follows. If a planar scene undergoes motion described by: $P'=\omega \times P+\tau$, where $\omega$ and $\tau$ are the rotation and translation respectively, then the out-of-plane motion of a plane, $n^T P=d$, is given by: $n'=\omega \times n$, and $d'=n^T \tau$. It follows that for constant velocities, $\omega$ and $\tau$, the induced velocities for the plane parameters n and d are also constant.

For segment s, the motion smoothness cost function is given in equation (6):

$$E_o(\psi_{s,1,0}, \ldots, \psi_{s,T,0}) = \sum_{t=2}^{T-1} \left\{ \left| \frac{n_{s,t-1,0} + n_{s,t+1,0}}{|n_{s,t-1,0} + n_{s,t+1,0}|} - n_{s,t,0} \right| + \kappa \left| \frac{\tilde{d}_{s,t-1,0} + \tilde{d}_{s,t+1,0}}{2} - \tilde{d}_{s,t,0} \right| \middle/ (|\tilde{d}_{s,t+1,0} - \tilde{d}_{s,t-1,0}| + \delta) \right\}, \quad (6)$$

where $\kappa$ is the weight for the second term, and $\delta$ is a small positive number that is added to the equation to avoid overflow in division.

Batch Formulation And Incremental Estimation

With the above geometric constraints and the motion model defined, estimating the depth maps from time 1 to T is equivalent to finding the plane parameters that minimize the cost function given in equation (7):

$$\varepsilon = \alpha \sum_{t=1}^{T} E_t^1(\psi_{0,t,0}, \ldots, \psi_{S,t,0}) + \\ \beta \sum_{t=1}^{T-1} \sum_{s=1}^{S} E_t^2(R_{s,t \to t+1}, T_{s,t \to t+1}) + \\ \sum_{s=1}^{S} \{\gamma E_o(\psi_{s,1,0}, \ldots, \psi_{s,T,0}) + \lambda E_i\} \quad (7)$$

where the constants $\alpha, \beta, \gamma, \lambda \in [0,1]$ are the weights of each term. Ideally, all the terms in the above function should be utilized to find the optimal depth maps. However, the second term, i.e., the scene flow constraint, relies on the homographies over time which, in turn, depend on the accuracy of flow or piecewise parametric motion estimation. This term may become unreliable for untextured regions or segments with small spatial support. Therefore, this term is deleted from the cost function for the algorithm used in the exemplary embodiment of the invention. Thus, one exemplary cost function relies only on the spatial match measure and the temporal smoothness of motion to compute the depth maps.

The in-plane motion smoothness term $E_i$ may also dropped for the same reason. In this mode, motion estimates in terms of optical flow are still utilized but only for the purpose of establishing temporal correspondences between pixels or segments. This correspondence is subsequently employed to predict planar parameters using the motion smoothness constraint. Such a simplification lowers the requirement for the accuracy of the optical flow because, as long as the corresponding pixels are in the correct segment, the errors in flow fields will not affect the prediction of the plane parameters. The advantages of this simplification are further described below. Thus, the cost function of equation (7) may be simplified to that shown in equation (8):

$$\varepsilon(\psi_{s,1,0}, \ldots, \psi_{s,T,0}) = \alpha \sum_{t=1}^{T} E_t^1(\psi_{0,t,0}, \ldots, \psi_{S,t,0}) + \\ \gamma \sum_{s=1}^{S} E_o(\psi_{s,1,0}, \ldots, \psi_{s,T,0}). \quad (8)$$

When the depth information before time t is given or already estimated, the depth at time t can be computed using an incremental formulation. The cost function consists of the spatial match measure at time t and a motion smoothness measure. More specifically, the cost function for the incremental formulation is given by equation (9):

$$\varepsilon_t = \alpha E_t^1(\psi_{1,t,0}, \ldots, \psi_{S,t,0}) + \gamma \sum_{s=1}^{S} E(\psi_{s,t,0}^-, \ldots, \psi_{s,t,0}), \quad (9)$$

where $\psi_{s,t,0}^-$ represents the predicted plane parameters based on the smooth motion model. The function $E(\psi_{s,t,0}^-, \psi_{s,t,0})$ represents the difference between the two sets of plane parameters, $\psi_{s,t,0}^-$ and $\psi_{s,t,0}$. This function can be computed as the average distance between points inside a segment.

Figure 2:
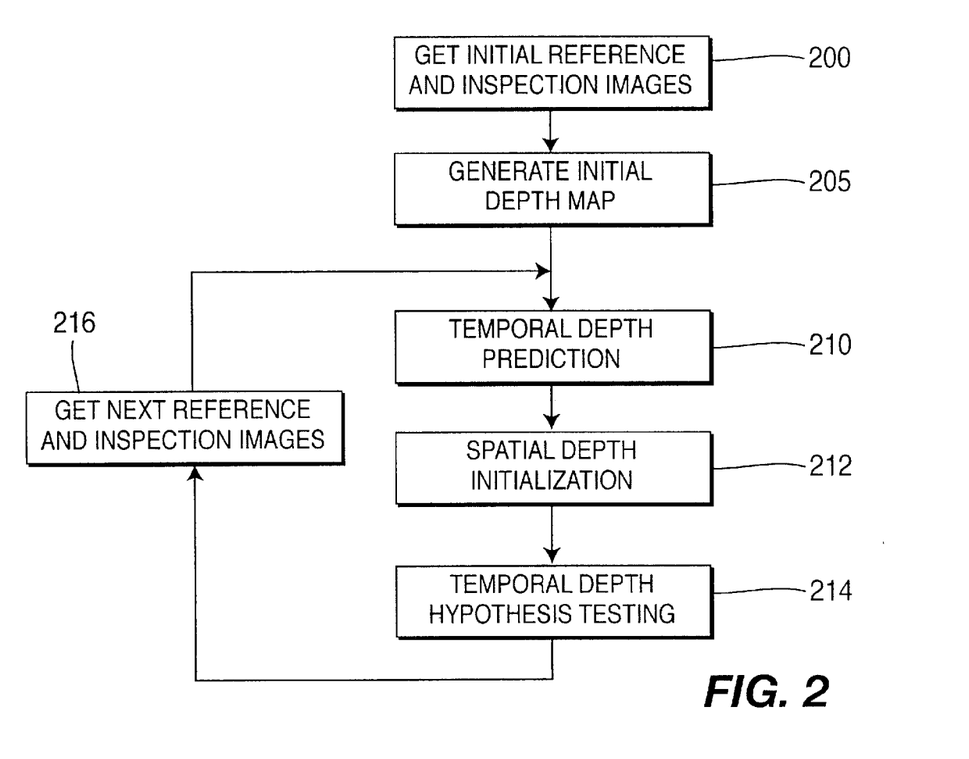
FIG. 2 is a flow-chart diagram of an exemplary dynamic depth recovery method according to the present invention.

The analysis set forth above provides the foundation for the algorithm used by the exemplary embodiment of the invention. The basic flow-chart of the exemplary algorithm based on the incremental formulation presented above is shown in FIG. 2.

The first step in the algorithm, step 200 to obtain the initial reference and inspection images. Next, at step 205, the process generates an initial depth map using these images. This depth map may be generated by any of the stereo matching algorithms described above, using the initial reference view and one or more of the initial inspection views as the two stereo images. The time parameter for these images is t=0. One method for finding an initial depth map is to apply the color segmentation algorithm to the initial reference and inspection views, as described below.

The color segmentation algorithm described herein is used to obtain the initial depth map for the set of images. This algorithm, however, is also used, as described below, in the incremental formulation that generates depth maps for the images at each time interval.

Stereo matching deals with the problems of matching ambiguity, image deformations due to variations in scene structure, delineation of sharp surface boundaries, and unmatched regions due to occlusions/deocclusions in the two images. Typically in order to handle ambiguities in matching, window operations are performed to integrate information over regions larger than a pixel. This leads to the classical matching disambiguation versus depth accuracy trade-off. In areas with sufficient detail, small windows may provide enough matching information, but matching over a larger range of depth variations (disparities) may not be possible due to ambiguous matches.

One of the difficult tasks in many existing stereo algorithms is to find correct depth in textureless regions. Because small windows are inherently ambiguous in these regions, the depth map created by picking the best matching score is usually noisy.

An observation important to the exemplary color segmentation approach is that within a region of homogenous color, there is usually no large depth discontinuity. This observation implies that a depth representation based on segmenting the reference image into homogeneous color regions may be useful. A plane plus residual disparity representation for each color segment has been used to create an exemplary color segmentation method of local depth mapping. More specifically, in each color segment, the depth surface may be modeled as a plane surface plus small depth variations for each pixel. Using this representation, the depth in textureless regions is guaranteed to be smooth. Further, a way of deriving reasonable depth estimates even for unmatched regions by hypothesizing depth of a given region based on neighboring regions may be employed.

This model guarantees smoothness in textureless regions. For smooth but textured regions, where many small segments are present, smoothness is not enforced across segments. Depth estimation, however, tends to be reliable in these areas even without the smoothness constraint.

Exemplary embodiments of this invention are based on the generally valid heuristic that depth boundaries coincide with color segmentation boundaries. Association of color segments with semantic/object regions need not be attempted as, in general, color segmentation works. A way of initializing the representation for each segment is to compute an image-disparity based local matching score. Then find the best match for each pixel in a segment and fit a plane to the segment. A simple recursive algorithm may be used to adjust the plane.

Also, instead of trying to enforce global visibility based on local matching scores or along scan lines only, a more basic global matching criterion may be employed. This criterion states that if the depth is correct, the image rendered according to the depth into the second viewpoint should be similar to the real view from that viewpoint. This criterion follows the paradigm of analysis by synthesis and is the ultimate matching criterion. It provides a method for checking the goodness of any given depth map by enforcing global visibility. Accurate depth boundaries and thin structures can be obtained based on this criterion too.

Two immediate concerns regarding this approach are the huge solution space and the expensive synthesis process. For an image with N pixels suppose each pixel may have d different quantized depth values, the total number of different possible depth maps is $d^N$. An exhaustive search warps each of these configurations and finds the best configuration as the solution.

The second issue with the proposed approach is the cost of synthesis in every iteration. Even if the solution space is linear in the number of pixels, say 0.5N, it is still computationally impractical to warp the reference image 0.5N times to find the best depth map.

To solve with the first problem a color segmentation based representation and neighborhood depth hypothesizing method are combined in a local search algorithm. More important than computational considerations, this approach enforces depth smoothness in homogeneous color regions and also makes it possible to infer reasonable depth for unmatched regions.

A straightforward local greedy search algorithm may be used. In an exemplary algorithm, all the neighboring depth hypotheses of a given segment are tested while all other segments are kept fixed. The neighborhood depth hypothesis that produces the best global matching score is recorded. After all segments have been tested, their depths are updated by choosing from the initial depth and the best neighborhood hypothesis according to the matching scores. This process is performed iteratively until either the total number of segments with depth changes is small or the number of iterations exceeds a certain value.

This process allows the correct depth to propagate because, by hypothesizing the correct depth, the warped image induces better matching. For example, the depth of a background segment may be wrongfully computed as the foreground depth because of the propagation of depth from a nearby textured foreground region. However, the error can be corrected if the background segment is hypothesized to have the depth of the correct neighboring background segment and that hypothesis wins. This process has been found to tolerate large initial depth errors.

Figure 5:
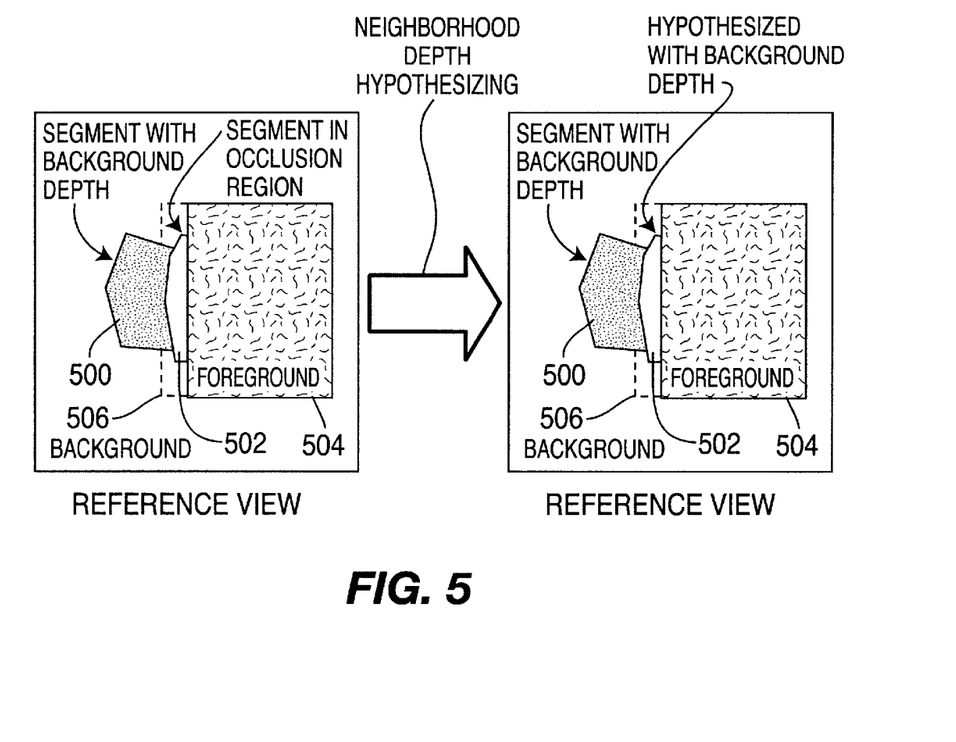
FIG. 5 is a pair of image drawings that are useful for describing color segmentation.

Another benefit of hypothesizing depths in neighborhoods is that it helps to derive reasonable depth for unmatched regions. For unmatched regions, the depth is more likely to be the extension of the neighboring background segment as shown in FIG. 5. The drawing in FIG. 5 illustrates three segments in a reference image, segment 500 in the background, segment 504 in the foreground, and segment 502 which is occluded in a second image (not shown). The dotted line 506 illustrates the position of segment 504 in the second image. Because segment 502 appears in only one of the image it is not possible to obtain a certain depth using a stereo matching algorithm. In the exemplary color segmentation method of the present invention the depth of segment may be hypothesized to be at the same depth as the segment 500 rather than being left undefined. This estimate may be refined by information from additional images.

After an initial depth map has been generated at step 205 of FIG. 2, the process may enter a loop where the depth map is updated incrementally for each new set of reference and inspection images. The next step in the process, step 210 predicts plane parameters $\psi_{s,t,0}^-$ from the previous time instants. This step consists of three tasks: (1) for each segment, find the corresponding regions in the previous time instants, (2) find or estimate plane parameters in those regions, and (3) predict the corresponding plane parameters at current time instant. These tasks are described in more detail below. After the temporal depth prediction process has been performed, step 212 performs a spatial initialization of the piecewise planar depth representation $\psi_{s,t,0}^0$ in the reference view using the spatial match measure $E_t^1$ only. Next, at step 214, the process performs global depth hypothesis testing. For each segment s, the process chooses either $\psi_{s,t,0}^-$ or plane parameters in the initial depth estimation as its depth representation. Next, it find a locally optimal solution for the cost function in (9) using local search. A greedy hypothesis testing algorithm, described above, is suitable for this purpose.

Predicting Plane Parameters

In order to predict the plane parameters of a segment, the process first determines the corresponding position of the plane in the previous images. Based on the depth information of those regions in the prior images, the depth representation at the current time instant is predicted. In the exemplary embodiment of the invention, two complementary methods are used to find this temporal image correspondence. The first method is based on temporal color segmentation and is good for relatively large homogeneous color regions; the second method is based on optical flow and works well for textured regions.

Figure 3:
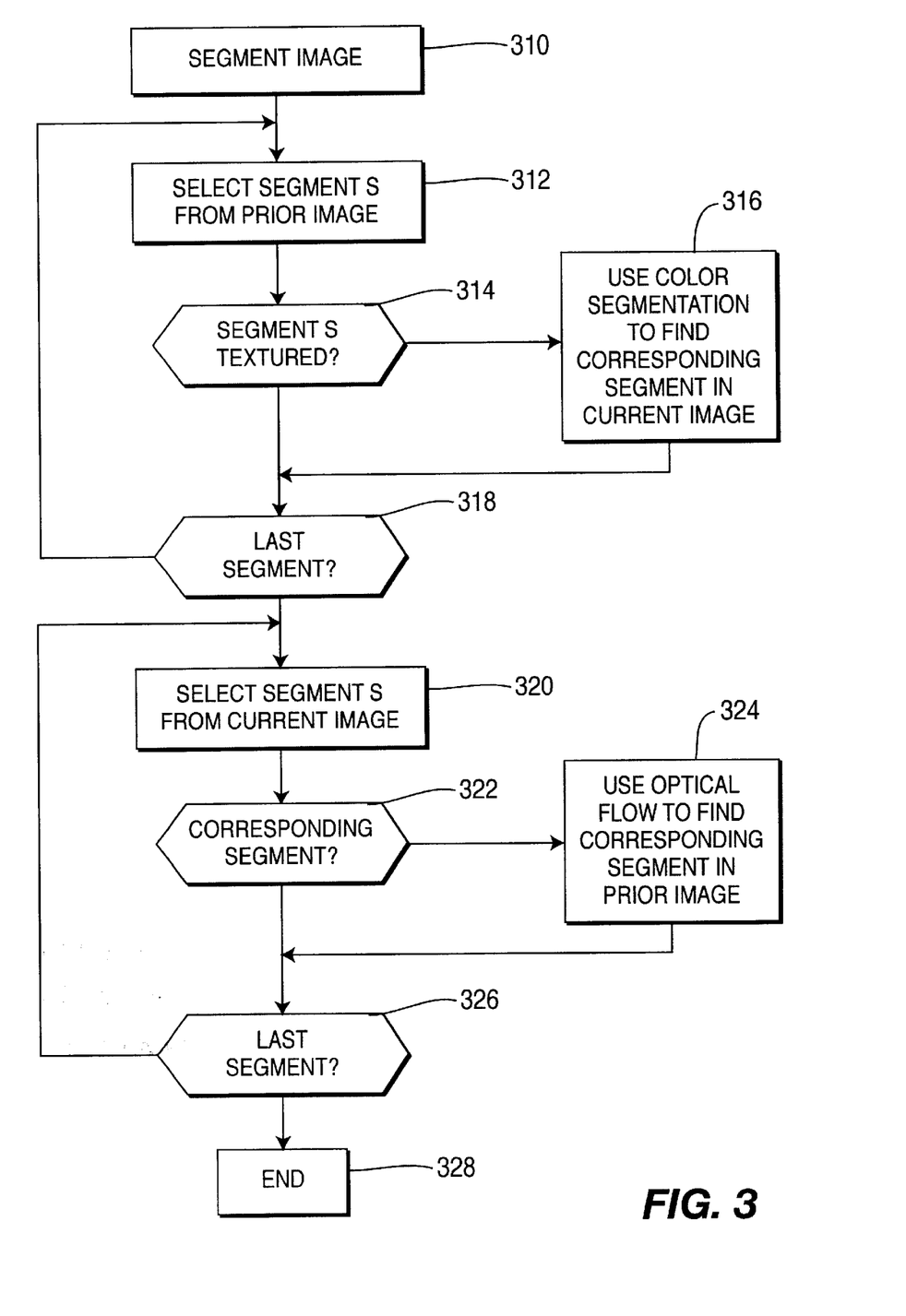
FIG. 3 is a flow-chart diagram that is useful for describing the temporal depth prediction step of the flow-chart diagram shown in FIG. 2.

As described below, a color segmentation depth mapping technique is used for large untextured scene surfaces and an optical flow depth mapping technique is used for textured surfaces (e.g. segments having spatial variations greater than a threshold or groups of adjacent small segments) and for surfaces in the current image that do not have corresponding segments in the prior image. First, the images are separated into color segments, step 310. Any algorithm that decomposes an image into homogeneous color regions will work for that purpose. The most important parameter in the algorithm is the range of pixel values (or the combined range of sub-pixel values) selected as a threshold for splitting a region into multiple sub-regions. If this range is small, the image can be over-segmented. If this range is large, the image is under-segmented. Because the exemplary algorithm enforces the depth continuity inside each segment strictly, under-segmentation should be avoided. The method proposed in *Robust Analysis of Feature Spaces: Color Image Segmentation*, by D. Comaniciu and P. Meer, in Proceedings of IEEE Conference on Computer Vision and Pattern Recognition, 1997 is one such method that may be used.

Next, at step 312, the process selects a segment from the prior image. At step 314, if the segment is smaller than a threshold value or if it is textured, it is not processed by the color segmentation algorithm and, so, control passes to step 318 to select the next segment. If the segment is larger than the threshold value and untextured, it's corresponding segment or segments in the current frame are identified at step 316, described below. After step 316, step 318 is executed which determines if the last segment in the image has been processed. If not, control returns to step 312 to select the next segment. If step 318 determines that every segment has been processed through the color segmentation algorithm, the segments that were not associated with corresponding segments from prior frames are processed. This processing begins at step 320 which selects a segment from the current image. Step 322 then determines if the selected segment has a corresponding segment in the prior image. If it does, then control passes to step 326, otherwise, the process, at step 324, finds a corresponding segment from the prior frame using an optical flow technique. At step 326, the process determines if the last segment has been processed. If not, control transfers to step 320 to select the next segment. If, at step 326, the last segment in the image has been processed, then all of the segments have been assigned corresponding segments from the prior frame and the process ends at step 328. For steps 320 through 328, groups of adjacent small segments may be combined into a single segment to be processed by the optical flow technique.

Figure 6A:
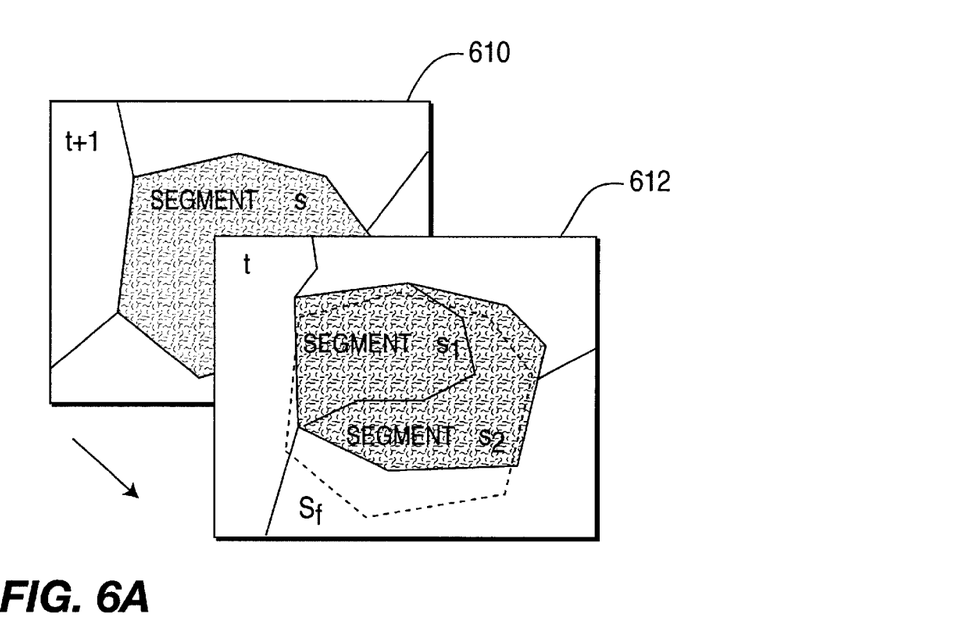
FIG. 6A is an image diagram which is useful for describing the color-based segmentation process shown in FIGS. 3 and 4.

The color segmentation process of step 316 operates as follows. For large untextured surfaces, the corresponding color segments at different time instants tend to have large overlapping areas when their motions are relatively small. This property is exploited by the exemplary embodiment of the invention to track corresponding segments over time. Briefly, and with reference to FIG. 6A, the steps of this algorithm are described below. For any large segment s in a prior image 610 at time instant t−1, the process projects the segment to the current image at time t. This projected segment is shown as segment $S_f$ in image 612 of FIG. 6A. At time t, the process finds the segments that satisfy the following criteria: 1) 85% of their areas are covered by $S_f$ and 2) the segments have a color that is similar to the color of segment s. These segments at time t, are deemed to correspond to the image segment s at time t−1 and are assigned an initial depth value that is the same as the segment s.

Figure 6B:
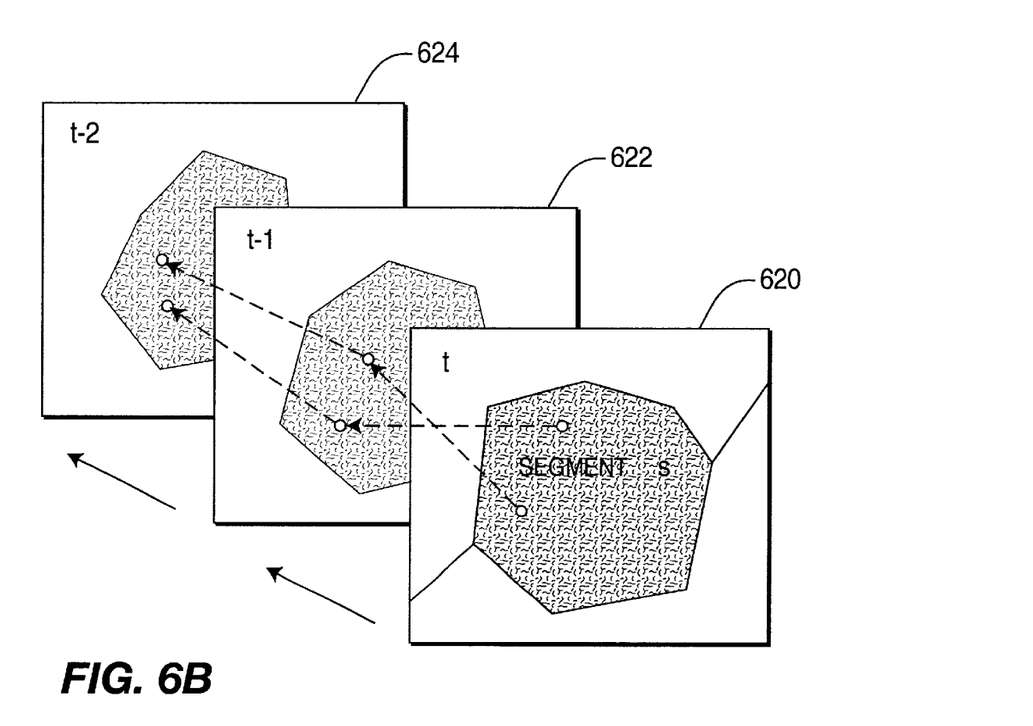
FIG. 6B is an image diagram which is useful for describing the optical flow step shown in FIG. 3.

The optical flow method of step 324 operates somewhat differently. Rather than matching a segment in a prior image to one or more segments in the current image, the optical flow method matches segments in the current image to corresponding segments in multiple prior images. For any pixel in segment s at time instant t, its corresponding position in the previous frame can be found if the optical flow is available. This process can also be used to find its image correspondences in multiple previous frames by concatenating the flow fields between three adjacent images, 620, 622 and 624, as shown in FIG. 6B. When a corresponding segment is found, the initial depth value for the segment s in the current image is set to the depth value from the prior frame. Exemplary optical flow techniques are described in an article by G. Adiv entitled "Determining Three-Dimensional Motion and Structure from Optical Flow Generated by Several Moving Objects," *IEEE Transactions on Pattern Analysis and Machine Intelligence*, vol. 7, no. 4, 1985.

Because optical flow is only used to find corresponding regions of a segment in the previous frames to fit a plane model, as long as the image correspondences are in the right region, error will not affect the resulting plane parameters. In addition, errors in optical flow only affect the temporal plane prediction, which is tested amongst a number of different hypotheses. Thus any erroneous depth values will in general not survive.

If a segment appears for the first time in the current image, it can not be assigned a corresponding segment from the prior image. As described above, with reference to FIG. 5, these segments are assigned the depth of an adjacent segment. Again, because the depth of each segment is tested amongst a number of hypotheses, erroneous initial depth values are corrected.

Predicting Plane Parameters

Once the image correspondences of each segment to segments in prior frames have been found, either by the segmentation based method or by the optical flow based method, the associated plane parameters may be obtained by merely copying the plane parameters for the corresponding segments. Alternatively, these parameters may be obtained by fitting planes in the current image to the depth values of tracked pixels from the prior images. Based on the plane parameters in the previous images, the plane parameters at current time instant can be predicted using the smooth motion model. For example, to predict plane parameters from two previous frames t-1 and t-2, if the plane parameters in those two frames are denoted as $[n_{s,t-1,0}, d_{s,t-1,0}]$ and $[n_{s,t-2,0}, d_{s,t-2,0}]$, the normal vector at time t is computed as the solution of $(n_{s,t-2,0} + n_{s,t,0}^-)/|n_{s,t-2,0} + n_{s,t,0}^-| = n_{s,t-1,0}$, which is $n_{s,t,0}^- = (2n_{s,t-1,0} n_{s,t-1,0}^T - I) n_{t-2}$. The plane distance parameter may then be computed as $d_{s,t,0}^- = 2d_{s,t-1,0} - d_{s,t-2,0}$.

Initial Depth Estimation

The color segmentation based stereo algorithm described in the above-referenced article by Tao et al. has been implemented to initialize the depth solution at the current time instant. This algorithm minimizes the spatial match measure $E_t^1$ and considers visibility implicitly in the global matching criterion. The four steps in this algorithm are (1) color segmentation, (2) correlation based initial depth computation, (3) plane fitting in each segment based on the initial depth, and (4) for each segment, comparison of the initial depth representation with depth hypotheses from its neighboring segments, and selection of the one that improves $E_t^1$ as the solution. The estimated initial depth representation for segment s is denoted as $\psi_{s,t,0}^0$.

This algorithm is described with reference to FIG. 4. After the image has been segmented, as described above, step 402 estimates an initial depth estimate for each segment. The three steps for the initial depth representation are (i) computing matching scores in an image-disparity volume, (ii) plane fitting in each segment, and (iii) residual disparity computation in each segment.

For the standard (parallel) stereo setup, the correspondence of a point in the second view lies on the same scan line as the reference view. The horizontal displacement of the corresponding point is called disparity. Similarly, for any arbitrary two views, the matching point lies on the epipolar line in the second image. For a standard stereo setup, to compute the dense point correspondence, matching scores in an image-disparity volume are first computed. More specifically, the matching scores for all possible horizontal displacements (within a range and with a fixed displacement interval) are computed first. This forms a three-dimensional matching score array, which is referred to herein as image-disparity matching volume. Each cell (x, y, d) holds the matching score for the correlation between pixel (x, y) in the reference image and (x+d, y) in the second image. Then, for each pixel, the best score is picked and the corresponding displacement is transformed into depth. The same idea may be applied to arbitrary views, except that the formulation is more complicated. In both cases, the isodisparity surface is a frontal plane in the reference view.

Once the image-disparity matching volume is computed, a plane is fitted for each color segment. We first find the best depth value for each pixel in the segment and then compute the best fit plane to the depth values. More specifically, the plane equation in each segment is given by equation (10):

$$Z_p = 1/Z = ax + by + c \tag{10}$$

Where (x, y) is an image point, and Z is its depth in the reference camera coordinate system. Then, a, b, c are the least squares solution of a linear system shown in equation (11):

$$A[a, b, c]^t = B \tag{11}$$

Where each row of A is the [x, y, 1] vector for a pixel and each row of B is its corresponding 1/Z.

Figure 7A:
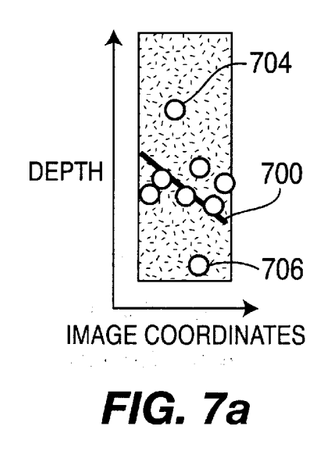
FIGS. 7A, 7B and 7C are graphs of depth versus image coordinates that are useful for describing the iterative planarization process shown in FIG. 4.
Figure 7B:
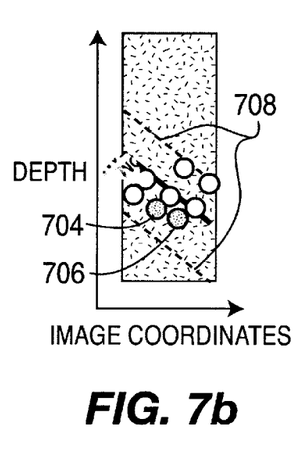
Figure 7C:
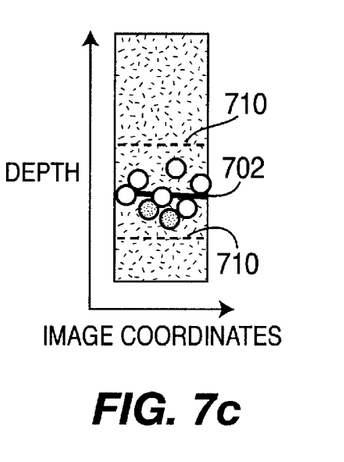

An iterative fitting process may be adopted to reduce the effect of outliers. This idea is illustrated in FIGS. 7a–7c. First, the depth of every pixel in the image is determined by picking the best matching score. Matching scores may be calculated by a number of measures such as normalized correlation matching (or sum of absolute difference) score of a gray level or color window around the point, similarity in motion between neighboring pixels etc. Different approaches for checking for alignment quality are described in a U.S. Pat. No. 6,629,175, METHOD AND APPARATUS FOR ENHANCING REGIONS OF ALIGNED IMAGES USING FLOW ESTIMATION by K. Hanna, et al.

Once the best matching scores have been determined, plane 700 is fitted in a segment. In the next iteration, the depth of each pixel is chosen within a given range 708 of the fitted plane by finding the best matching score in that range. In FIG. 7b outlying pixels 704 and 706 have been changed to fit within range 708. The plane parameters are updated accordingly based on these depths. FIG. 7c illustrates new plane 702 and new range 710. This process iterates several times until the plane parameters do not change significantly. This process is particularly useful for fitting planes in large textureless regions where matching ambiguities occurs. More generally, any other robust method of plane fitting like M-estimation, least median squares or RANSAC may be employed.

This exemplary representation allows small variations from the planar model in each segment. The actual depth of each pixel is shown in equation (12):

$$1/Z = Z_p + Z_r \tag{12}$$

Once the plane parameters are determined, for each pixel, $Z_p$ is known. $Z_r$ is computed by locating the best match in the image-disparity volume within a small range of $Z_p$. Residual disparity $Z_r$ is smoothed in each segment to obtain the initial color segmentation based depth representation.

Figure 4:
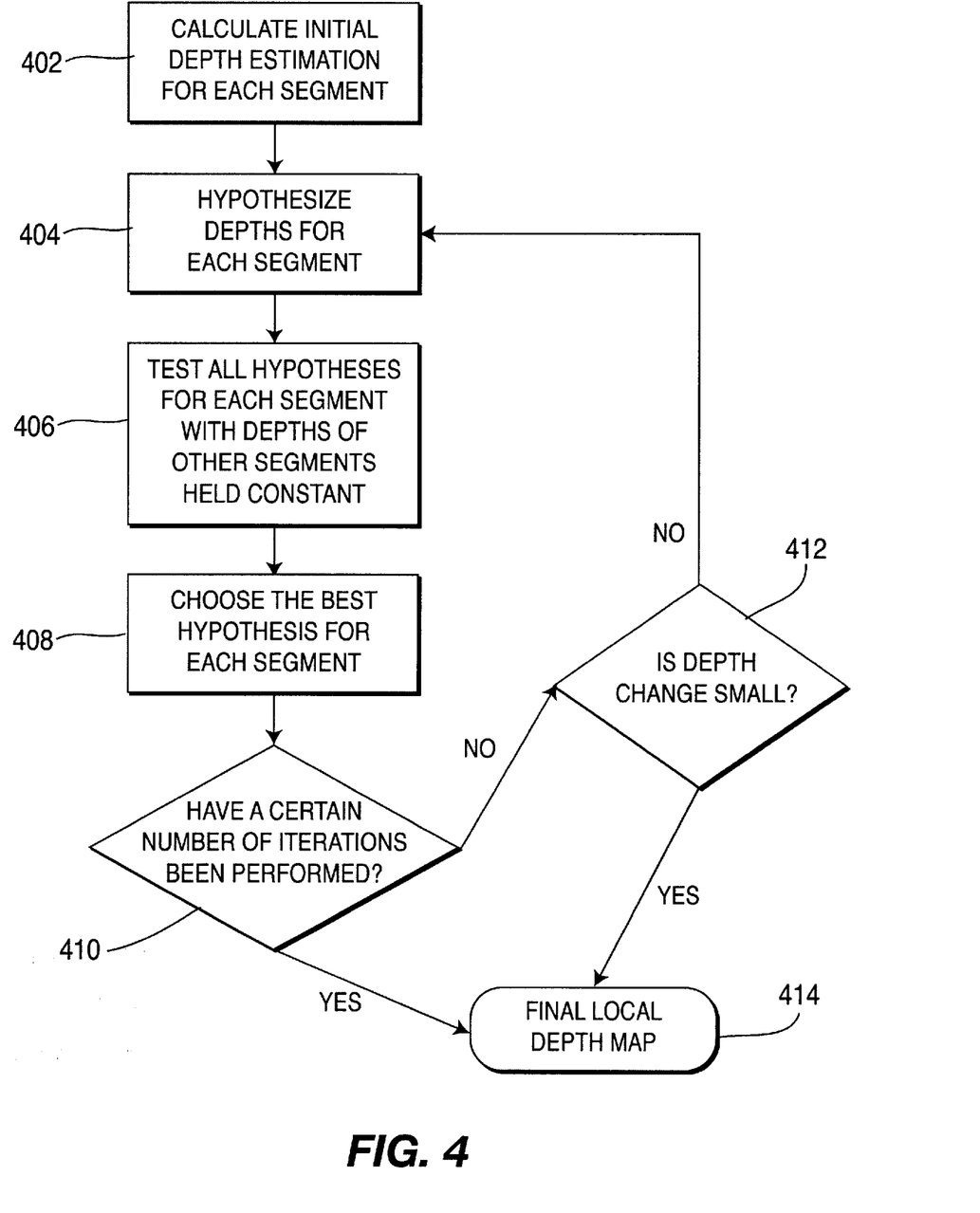
FIG. 4 is a flow-chart diagram that is useful for describing the color-based segmentation step of the flow-chart diagram shown in FIG. 3.

Referring to FIG. 4, the next step in the process, step 408, is to update the depth of each segment using the hypothesis with the best positive improvement. If none of the hypotheses gives positive improvement, keep the initial depth for that segment.

Temporal Depth Hypothesis Testing

The hypotheses for each segment s are the predicted plane parameters $\psi_{s,t,0}^-$, the initial plane parameters $\psi_{s,t,0}^0$, and the initial plane parameters of the neighboring segments of s. With plane parameters of the other segments fixed, these hypotheses are compared using the cost function in equation (9). This process is summarized as follows. At time instant t, for each segment s in the reference view the cost function in equation (9) is calculated for $\psi_{s,t,0}^-$, $\psi_{s,t,0}^0$, and $\psi_{k,t,0}^0$, k ∈ neighboring segments of s. Next, the plane parameter $\psi_{s,t,0}$ is set to be the one with the lowest cost value. These steps are shown in more detail in FIGS. 4 and 8.

In FIG. 4, at step 404, the process creates a number of depth hypotheses for each color segment. A hypothesis for each segment is generated from each neighboring segment. The plane parameters of a given segment are replaced using those of a neighboring segment to create the hypothesis. Then residual disparity for each pixel is found by searching around the plane and smoothing within the given segment.

Figure 8A:
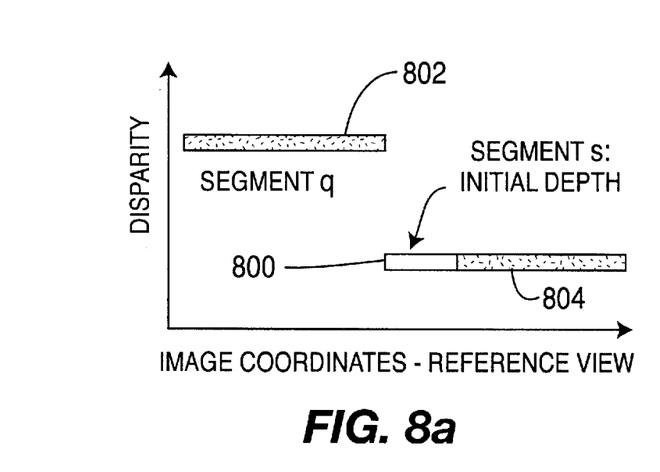
FIGS. 8A, 8B, 8C and 8D are graphs of disparity versus image coordinates that are useful for describing the hypothesis testing shown in FIG. 4.

The depth hypotheses of a single segment are then tested while all the other segments maintain the initial depth, step 406. The depth representations are updated after testing is done for all segments. Because only the depth of one segment is changed each time, only a small portion of the image is tested. An exemplary algorithm has been developed which takes advantage of this fact. This algorithm is illustrated in FIGS. 8a–8d. The reference image, FIG. 8a is first warped to the second view using the initial depth (i.e. initial depth hypothesis for each segment). We call this image the base warp, FIG. 8b.

Now if the depth of segment 800 is replaced by one of its neighborhood hypothesis, to compute its matching measure, only those pixels affected by the depth change are considered. For example, in FIG. 8c, the depth of segment 800 is changed. In the warped image, FIG. 8d, region 806 of segment 802 becomes visible while segment 800 becomes invisible. The matching score of the new depth map is computed by adding matching score of region 806 to the base warp score and subtracting matching score of segment 800. This example suggests an exemplary algorithm for testing these hypotheses.

Figure 8B:
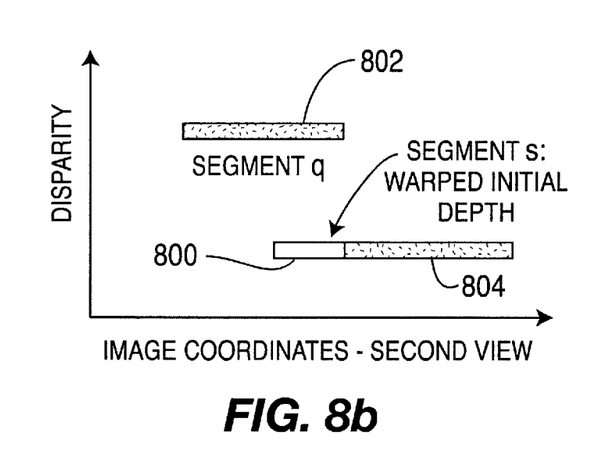
Figure 8C:
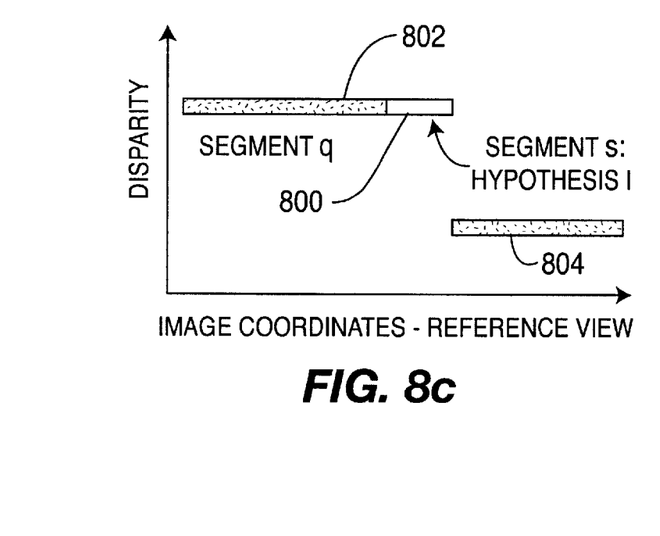
Figure 8D:
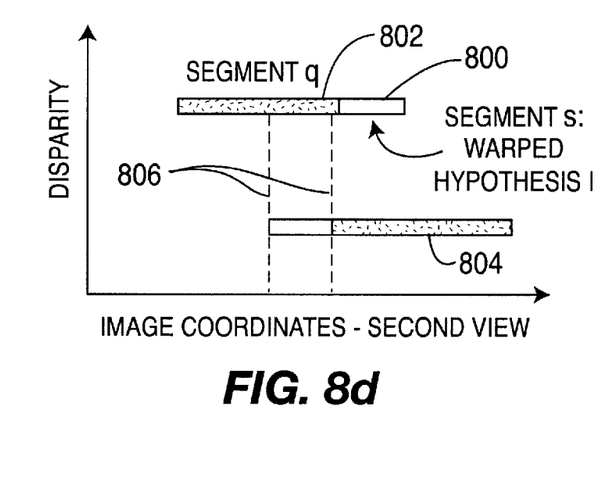

In this exemplary algorithm, for the base warp, for each pixel, the warped depths, the segmentation ID's, and the matching scores of the two top-most layers are stored. Changes in the matching scores over base warp are computed by adding the matching scores of pixels that become visible and subtracting scores of pixels that become invisible. Since for each test, only the depth of one segment is changed, only the two top-most layers may become visible and information regarding those two layers should be recorded. The third layer is blocked by at least one of the two layers originally in front of it and is always invisible, therefore it can not affect the matching score.

Referring again to FIG. 4, it is determined at step 410 if the process of improving the local depth maps has reached a predetermined maximum number of iterations. If this number has been reached the present depth map is selected as the final local depth map in step 414. If the number has not been reached, the most recent set of depth changes is analyzed at step 412. If the changes are less than a predetermined threshold, then the present depth map is selected as the final local depth map at step 414. Otherwise, the process returns to step 404 and another iteration of depth hypotheses is begun. It is noted that the exemplary ordering of steps 410 and 412 has been selected, since step 410 is less computationally demanding, but these steps may be reversed, or either one may be omitted.

The plane plus small residual disparity representation may not be sufficient for objects with highly curved surfaces. It is contemplated that more flexible depth representations may be used to solve this problem. Also, it may occasionally occur that depth boundaries appear in homogeneous color segments. A method of hypothesizing splits in problematic segments, or intentional over-segmentation, may be used to overcome these issues.

Additionally it is noted that color segmentation may be used for optical flow computation, too. By replacing the depth based forward warping with occlusion compatible traversal warping these methods may be combined. When certain information, such as positions of epipoles is roughly known, this may prove an advantageous approach.

Based on a piecewise planar scene representation, the present invention applies three constraints applicable to the problem of dynamic depth recovery. The observation that constant velocity motion of a plane causes constant changes in out-of-plane motion parameters enables a simple algorithm that enforces motion smoothness across time without using the 2D optical flow field in the estimation of 3D homographies and the resulting planar velocities. The optical flow is only used for finding temporal correspondences between frames for the purpose of predicting plane parameters. Because in-plane motion does not change the predicted plane parameters, more errors in the optical flow field can be tolerated.

An algorithm based on the global matching framework is proposed. Experimental results show that temporal consistency in depth estimation is achieved and sharp depth boundaries are preserved.

Although the invention has been described in terms of exemplary embodiments, it is contemplated that it may be practiced with modifications that are within the scope of the following claims.

What is claimed:

1. A method of generating a dynamic depth map of a scene from a sequence of sets of segmented images of the scene, including a current set of segmented images and a prior set of segmented images, each set of segmented images representing a plurality of different views of the scene at a respective instant, wherein each image in each set of segmented images includes a respective coordinate set, the method comprising the steps of:

a) determining a temporal correspondence between segments in at least one image in the current set of segmented images and corresponding segments in at least one image of the prior set of segmented images to obtain a temporal depth predicted value for each segment in the current set of segmented images;

b) determining a spatial correspondence among segments in the current set of segmented images to obtain a spatial depth predicted value for each segment in at least one image of the current set of images;

c) for each segment in the at least one image of the current set of segmented images, selecting one of the temporal depth predicted value and the spatial depth predicted value as an initial depth estimate of the segment;

d) generating a measure of difference between the at least one image in the current set of segmented images and each other image in the current set of segmented images;

e) repeating steps c) and d) selecting different initial depth values until a minimum measure of difference is generated in step d).

2. A method according to claim 1, where in the step of generating the measure of difference between the at least one image in the current set of segmented images and each other image in the current set of segmented images includes the steps of:

warping the at least one image in the current set of segmented images into the coordinate system of each of the other images in the current set of segmented images to obtain a set of respective warped images;

measuring a difference between the warped images and their respective other image in the current set of segmented images and summing the result to obtain a first term;

measuring an average distance between points in corresponding segments of the warped images and the respective other images in the current set of segmented images and summing the result, to obtain a second term; and summing the first term and the second term to obtain the measure of difference.

3. A method according to claim 1, wherein:

the step of selecting one of the temporal depth predicted value and the spatial depth predicted value selects the value for one segment in the at least one image while holding the depth values of other, adjacent segments unchanged; and the step of generating the measure of difference between the at least one image in the current set of images and each other image in the current set of images generates a difference only of the one segment and segments in the at least one image adjacent to the one segment.

4. A method according to claim 1, wherein the step of determining a temporal correspondence between segments in the at least one image in the current set of segmented image and corresponding segments in the at least one image of the prior set of segmented images includes the steps of:

classifying each segment in the at least one image in the prior set of segmented images as a textured segment or an untextured segment;

for each untextured segment, associating at least one corresponding segment in the at least one image of the current set of segmented images;

for each segment in the at least one image of the current set of segmented images that is not associated with one of the untextured segments, identifying the segment as a textured segment and identifying each textured segment in the at least one image of the current set of images with a corresponding segment from the at least one image in the prior set of images using an optical flow technique; and for each segment in the at least one image of the current set of segmented images, assigning a depth value of the corresponding segment of the at least one image in the prior set of images as the temporal depth predicted value.

5. A method according to claim 2, wherein:

the step of selecting one of the temporal depth predicted value and the spatial depth predicted value selects the value for one segment in the at least one image while holding the depth values of other, adjacent segments unchanged; and the step of generating the measure of difference between the at least one image in the current set of images and each other image in the current set of images generates a difference only of the one segment and segments in the at least one image adjacent to the one segment.

6. A method according to claim 5, wherein the step of determining a temporal correspondence between segments in the at least one image in the current set of segmented image and corresponding segments in the at least one image of the prior set of segmented images includes the steps of:

classifying each segment in the at least one image in the prior set of segmented images as a textured segment or an untextured segment;

for each untextured segment, associating at least one corresponding segment in the at least one image of the current set of segmented images;

for each segment in the at least one image of the current set of segmented images that is not associated with one of the untextured segments, identifying the segment as a textured segment and identifying each textured segment in the at least one image of the current set of images with a corresponding segment from the at least one image in the prior set of images using an optical flow technique; and for each segment in the at least one image of the current set of segmented images, assigning a depth value of the corresponding segment of the at least one image in the prior set of images as the temporal depth predicted value.

* * * * *